Patented Sept. 13, 1932

1,876,974

UNITED STATES PATENT OFFICE

MAX ALBERT KUNZ, OF MANNHEIM, AND KARL KOEBERLE AND ERICH BERTHOLD, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

HALOGEN DERIVATIVES OF ANTHANTHRONES

No Drawing. Application filed February 26, 1929, Serial No. 342,948, and in Germany July 28, 1928.

The present invention relates to the production of halogen derivatives of anthanthrones.

It is known to produce polynitroanthanthrones either by direct nitration of anthanthrones or by nitrating 1.1'-dinaphthyl-8.8'— or -2.2'-dicarboxylic acid or their derivatives and condensing the nitrated product with the aid of acid condensing agents. In the copending application Ser. No. 341,056 filed February 18, 1929, the production of mononitroanthanthrones is described. The nitro derivatives of anthanthrones, however, are of no great importance as dyestuffs by reason of their not very valuable dyeing properties.

We have now found that valuable uniform halogen derivatives which are for the most part adapted for direct use as dyestuffs and partly also as intermediate products are obtained by directly replacing the nitro group or groups in mono- or polynitroanthanthrones by halogen. This is effected by heating the said anthanthrone derivatives with halogen or halogenating agents, such as acid halides, under pressure if desired, in an organic diluting medium such as trichlorobenzene, nitrobenzene and the like. Also organic halogenating agents, for instance benzoyl chloride or benzoyl bromide may be employed as diluting media. When carrying out the treatment under strong conditions, for instance by extending the period of heating the nitroanthanthrone with halogen or a halogenating agent, or by working under pressure at higher temperatures, such as temperatures above 200° C., not only the nitro groups of the anthanthrones are replaced by halogen but further halogenation occurs.

Excellent yields of halogen anthanthrones in a very pure state are obtained according to our invention. The products dissolve in concentrated sulphuric acid to a green solution and dye cotton from violet vats yellow orange to orange shades.

The following examples will further illustrate the nature of the said invention which, however, is not limited thereto. The parts are by weight.

Example 1

35 parts of the mononitroanthanthrone, obtainable by nitrating anthanthrone in nitrobenzene with 96 per cent nitric acid, are boiled in 20 times the amount of benzoyl-chloride until no unchanged initial material can be detected. The reaction mass is allowed to cool and worked up in the usual manner. The monochloranthanthrone obtained in the form of uniform orange yellow crystals dissolves to give a green solution in sulphuric acid and dyes cotton orange yellow shades from a violet red vat.

The monobrom derivative is obtained in a similar manner by employing benzoyl bromide.

Example 2

Chlorine is passed into a suspension of 10 parts of dinitroanthanthrone, obtainable by nitrating anthanthrone with concentrated nitric acid, in 30 to 50 times its quantity of trichlorobenzene, at 175° C., until a test portion dissolves in sulphuric acid with the formation of a pure green coloration. The dichloroanthanthrone so obtained in the form of yellow needles dissolves in concentrated sulphuric acid with a green coloration and gives clear yellow orange shades on cotton from a violet vat.

The replacement of the nitro group may also be carried out by boiling the dinitroanthanthrone with benzoyl chloride.

If tetranitroanthanthrone, which may be prepared by nitrating anthanthrone with a mixture of nitric and sulphuric acids, is employed instead of the dinitroanthanthrone, pure tetrachloranthanthrone is obtained in the form of orange colored crystals. The solution of the same in sulphuric acid is also green.

Example 3

Chlorine is passed into a suspension of 10 parts of mononitroanthanthrone, obtainable by nitrating anthanthrone in nitrobenzene with strong nitric acid, in 50 times the amount of trichlorobenzene at 180° C., until nitrogen cannot any more be detected and a solution of a sample in concentrated sulphuric acid shows the green coloration of dissolved dichloroanthanthrone. The properties of the product obtained correspond to those of the product described in Example 2.

*Example 4*

10 parts of bromonitroanthanthrone obtainable by brominating mononitroanthanthrone in chlorosulphonic acid at 60° C., with the aid of iodine as halogen carrier, are heated to boiling with 50 times the amount of benzoylchloride, until the reaction product is free from nitrogen and dissolves to a green solution in concentrated sulphuric acid. After cooling the chlorobromoanthanthrone is filtered by suction. It is an orange powder when dry, dissolves to a green solution in concentrated sulphuric acid and dyes cotton from a red violet vat orange shades.

*Example 5*

Bromine is dropped into a suspension maintained at 180° C. of 10 parts of mononitroanthanthrone obtainable as described in Example 3, in 400 parts of nitrobenzene to which 1 part of iron powder has been added, until the reaction product is free from nitrogen and dissolves to a green solution in concentrated sulphuric acid. After cooling the bromoanthanthrone crystallizing in red needles is filtered off by suction. It dissolves to a green solution in concentrated sulphuric acid and dyes cotton fast orange shades from a violet red vat.

What we claim is:

1. A process of producing halogen derivatives of anthanthrones which comprises heating a nitroanthanthrone in an organic diluting medium of high boiling point and of the aromatic series with a halogenating agent, at least until all nitro groups are eliminated.

2. A process of producing anthanthrone containing two halogen atoms which comprises heating an anthanthrone containing at least one nitro group in an organic diluting medium of high boiling point and of aromatic series with a halogenating agent, at least until all nitro groups are eliminated.

In testimony whereof we have hereunto set our hands.

MAX ALBERT KUNZ.
KARL KOEBERLE.
ERICH BERTHOLD.